(12) United States Patent
Kim et al.

(10) Patent No.: US 7,495,735 B2
(45) Date of Patent: Feb. 24, 2009

(54) LIQUID CRYSTAL DISPLAY

(75) Inventors: Hee-Seob Kim, Gyeong-do (KR); Joon-Hak Oh, Seoul (KR); Doo-Hwan You, Suwon-si (KR); Young-Chol Yang, Kunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 259 days.

(21) Appl. No.: 11/566,496

(22) Filed: Dec. 4, 2006

(65) Prior Publication Data

US 2007/0097307 A1 May 3, 2007

Related U.S. Application Data

(63) Continuation of application No. 10/866,536, filed on Jun. 10, 2004, now Pat. No. 7,158,201.

(30) Foreign Application Priority Data

Jun. 10, 2003 (KR) .......................... 2003-0037090

(51) Int. Cl.
*G02F 1/1343* (2006.01)

(52) U.S. Cl. ........................ 349/143; 349/139

(58) Field of Classification Search ................. 349/129, 349/143
See application file for complete search history.

(56) References Cited

U.S. PATENT DOCUMENTS

| 6,936,845 | B2 * | 8/2005 | Kim et al. ...................... 257/59 |
| 6,995,394 | B2 * | 2/2006 | Hong et al. .................... 257/59 |
| 7,158,201 | B2 * | 1/2007 | Kim et al. ..................... 349/129 |
| 7,256,849 | B2 * | 8/2007 | Kim et al. ..................... 349/129 |
| 2004/0070713 | A1 * | 4/2004 | Song .......................... 349/129 |
| 2004/0125253 | A1 * | 7/2004 | Kim et al. ...................... 349/43 |

* cited by examiner

*Primary Examiner*—Michelle R Connelly Cushwa
*Assistant Examiner*—Rhonda S Peace
(74) *Attorney, Agent, or Firm*—F. Chau & Associates, LLC

(57) ABSTRACT

A thin film transistor array panel is provided, which includes: a substrate; a plurality of first signal lines formed on the substrate; a plurality of second signal lines intersecting the first signal lines to define pixel areas; first and second pixel electrodes disposed substantially in a pixel area and having different areas; a plurality of thin film transistors connected to the first and the second signal lines and at least one of the first and the second pixel electrodes; a coupling electrode overlapping the second pixel electrode; and a tilt direction defining member for determining tilt directions of liquid crystal molecules formed on the substrate.

19 Claims, 12 Drawing Sheets

LIQUID CRYSTAL DISPLAY

CROSS-REFERENCE TO RELATED APPLICATIONS

This application is a Continuation of U.S. patent application Ser. No. 10/866,536 filed Jun. 10, 2004, now U.S. Pat. No. 7,158,201 which claims priority, to Korean Application No. 2003-37090 filed Jun. 10, 2003, the entireties of which are incorporated herein by reference.

BACKGROUND OF THE INVENTION (a) Field of the Invention

The present invention relates to a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field generating electrodes to generate an electric field in the LC layer, which determines orientations of LC molecules in the LC layer to adjust polarization of incident light, Among the LCDs, a vertical alignment(VA) mode LCD, which aligns LC molecules such that the long axes of the LC molecules are perpendicular to the panels in absence of electric field, is spotlighted because of its high contrast ratio and wide viewing angles The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the viewing angle is widened.

However, the VA mode LCD has relatively poor lateral visibility compared with front visibility.

SUMMARY OF THE INVENTION

A thin film transistor array panel is provided, which includes: a substrate; a plurality of first signal lines formed on the substrate; a plurality of second signal lines intersecting the first signal lines to define pixel areas; first and second pixel electrodes disposed substantially in a pixel area and having different areas; a plurality of thin film transistors connected to the first and the second signal lines and at least one of the first and the second pixel electrodes; a coupling electrode overlapping the second pixel electrode; and a tilt direction defining member for determining tilt directions of liquid crystal molecules formed on the substrate.

A liquid crystal display is provided which includes: a thin film transistor array panel, a common electrode panel, a first tilt direction defining member formed on the thin film transistor array panel, and a second tilt direction defining member determining tilt directions of liquid crystal molecules along with the first tilt direction defining member formed on the common electrode panel. The thin film transistor array panel includes: a plurality of first signal lines; a plurality of second signal lines intersecting the first signal lines to define pixel areas; first and second pixel electrodes disposed substantially in a pixel area and having different areas; a plurality of thin film transistors connected to the first and the second signal lines and at least one of the first and the second pixel electrodes and a coupling electrode overlapping the second pixel electrode. The common electrode panel includes a common electrode for generating an electric field along with the first and the second pixel electrodes;

The first and the second tilt direction defining members may include cutouts formed in the pixel electrodes and the common electrode.

The liquid crystal display is provided, which includes: a first substrate; a plurality of first signal lines formed on the first substrate; a plurality of second signal lines intersecting the first signal lines to define pixel areas; first and second pixel electrodes disposed substantially in a pixel area; a plurality of thin film transistors connected to the first and the second signal lines and at least one of the first and the second pixel electrodes; a coupling electrode overlapping the second pixel electrode; a second substrate facing the first substrate; a common electrode formed on the second substrate; a first tilt direction defining member formed on the thin film transistor array panel; and a second tilt direction defining member determining tilt directions of liquid crystal molecules along with the first tilt direction defining member formed on the common electrode panel, wherein a ratio of a voltage difference between the first pixel electrode and the common electrode and a voltage difference between the second pixel electrode and the common electrode is in a range between about 0.05-0.95.

The tilt direction determining member may include a cutout of one of the first and the second pixel electrodes.

The coupling electrode may be connected to a drain electrode of one of the first and the second pixel electrodes may have edges facing each other and forming a gap and the gap includes oblique portions making an angle of about 45 degrees with the gate lines.

The thin film transistor array panel may further include a third signal line intersecting the second signal lines and supplied with a reference voltage, wherein the first and the second pixel electrodes are capacitively coupled to each other through the coupling electrode, and the thin film transistors comprise a first transistor connected to one of the first signal lines, one of the second signal lines and the first pixel electrode and a second transistor connected to one of the first signal lines, the third signal line, and the second pixel electrode.

The thin film transistor array panel may further include an insulating layer disposed between the first and the second pixel electrodes and the first and the second transistors and having a first contact hole for (connecting the second pixel electrode to the second transistor.

The thin film transistor array panel may further include an insulating layer disposed between the first and the second pixel electrodes and the first and the second transistors, wherein the first pixel electrode is connected to the first transistor or overlaps a drain electrode of the first transistor.

The first pixel electrode may have an area larger than the second pixel electrode.

The first pixel electrode may have an area once to six times an area of the second pixel electrode.

The thin film transistor array panel may further include a third pixel electrode capacitively coupled to the first pixel electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
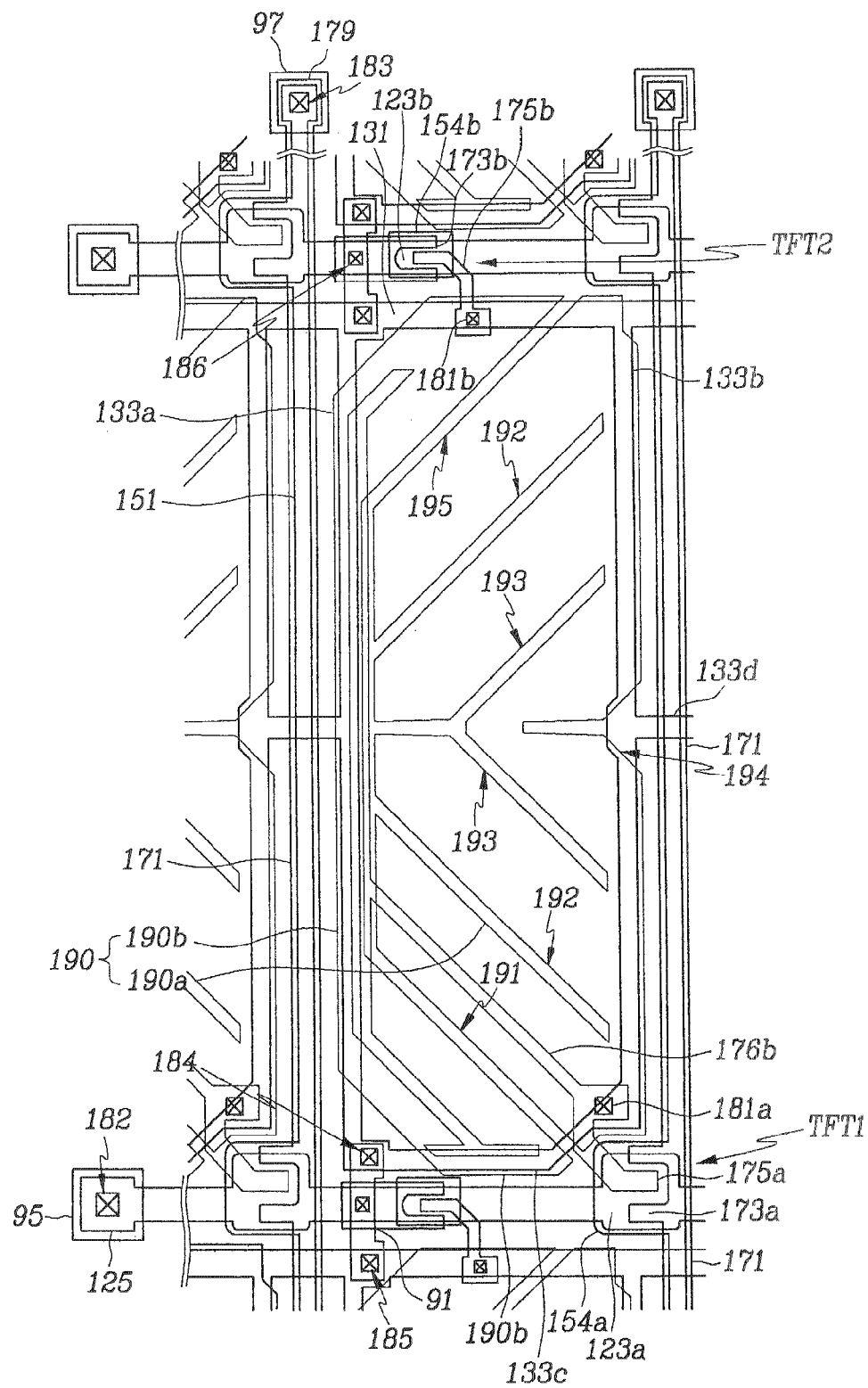
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-5.

Figure 2:
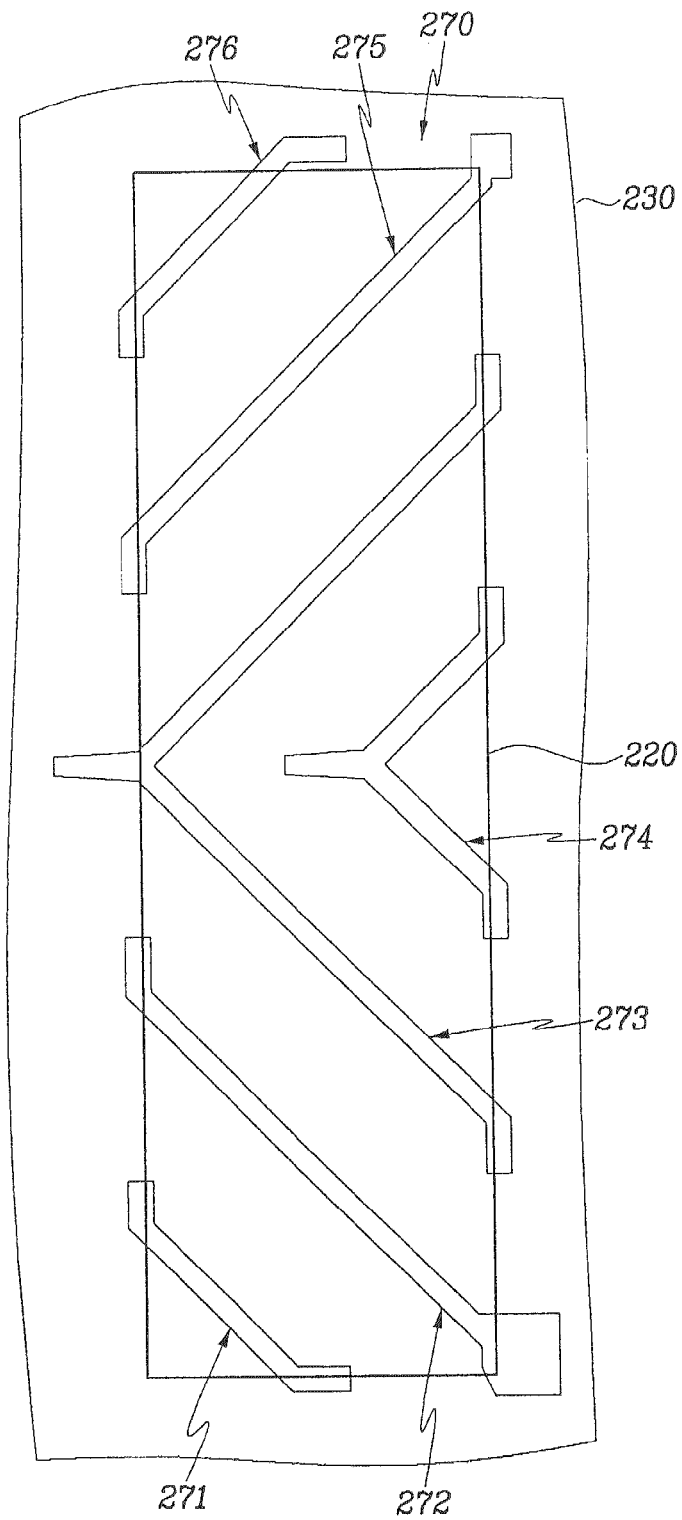
FIG. 2 is a layout view of a common electrode panel of an LCD according to an embodiment of the present invention.
Figure 3:
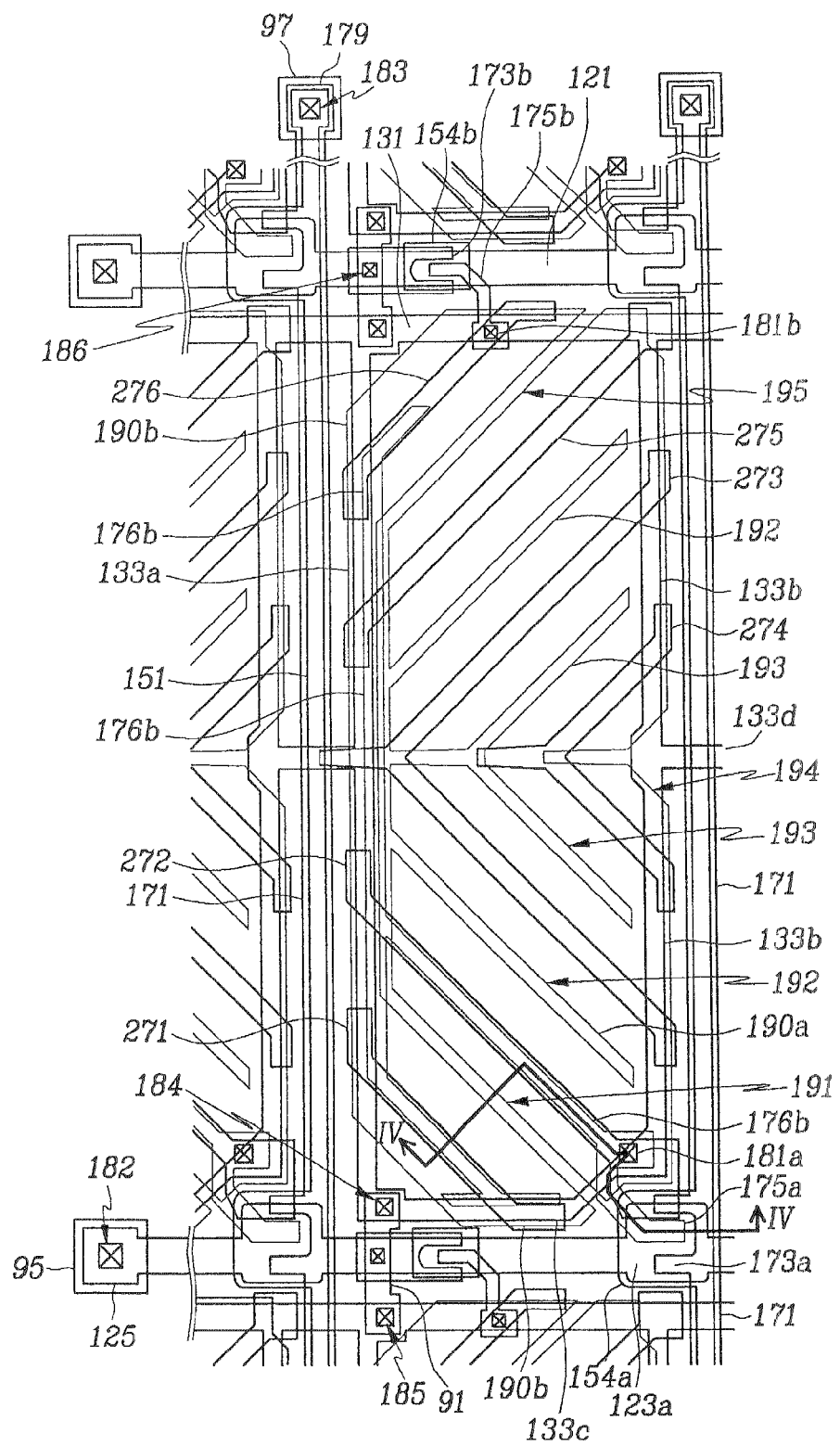
FIG. 3 is a layout view of an LCD including the TFT array panel shown in FIG. 1 and the common electrode panel shown in FIG. 2.
Figure 4:
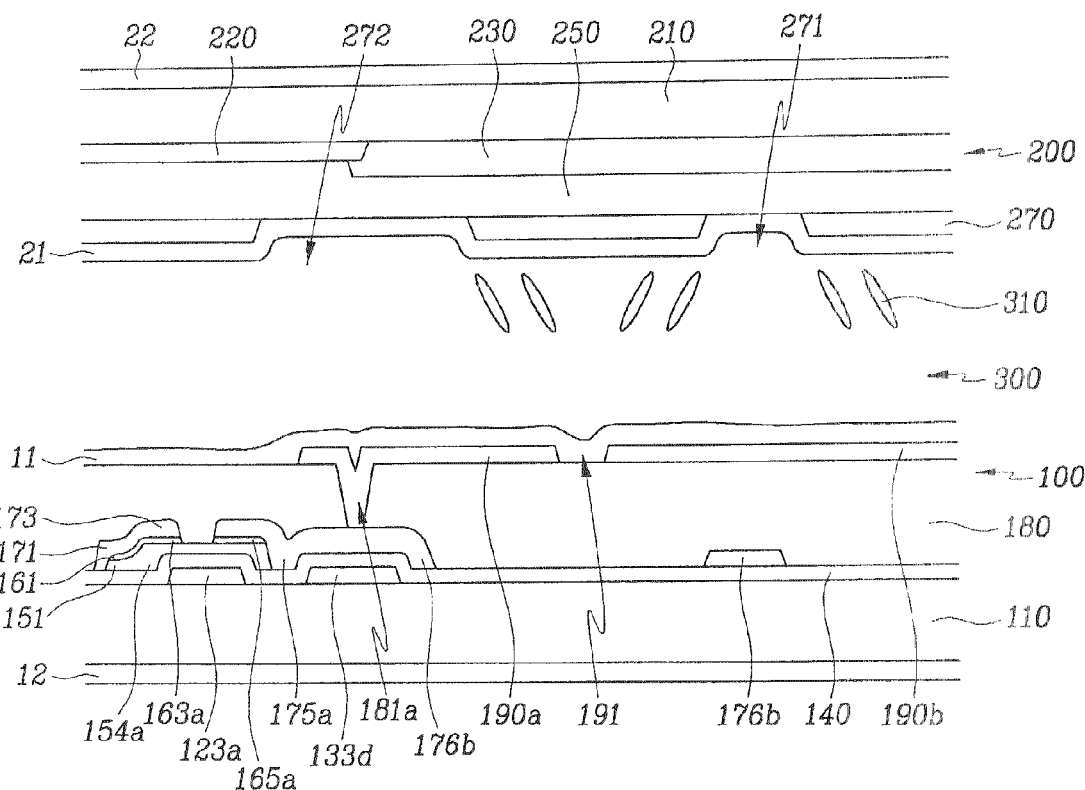
FIG. 4 is a sectional view of the LCD shown in FIG. 4 taken along the line V-V'.

FIG. 1 is a layout view of a TFT panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 4 taken along the line V-V'.

An LCD according to an embodiment of the present invention includes a TFT array panel 100, a common electrode panel 200, and a LC layer 300 interposed between the panels 100 and 200 and containing a plurality of LC molecules 310 aligned substantially vertical to surfaces of the panels 100 and 200.

The TFT array panel 100 is now described in detail with reference to FIGS. 1, 3 and 4.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of first and second gate electrodes 123a and 123b and an end portion 125 having a large area for connection with an external driving circuit. The first gate electrode 123a has a width wider than other portions of the gate line 121.

Each storage electrode line 131 extends substantially in the transverse direction and includes a plurality of ring-shaped branches 133a-133c and a plurality of branch connections 133d connected between adjacent branches 133a-133c. Each branch set includes a pair of first and second storage electrodes 133a and 133b extending in a longitudinal direction and a third storage electrode 133c connected to ends of the first and the second storage electrodes 133a and 133b and extending in the transverse direction and in an oblique direction. The storage electrode tines 131 are supplied with a predetermined voltage such as a common voltage, which. is applied to a common electrode 270 on the common electrode panel 200 of the LCD. The third storage electrodes 133c may be connected to each other.

The gate lines 121 and the storage electrode lines 131 is preferably made of Al containing metal such as Al and Al alloy, Ag containing metal such as Ag and Ag alloy, Cu containing metal such as Cu anti Cu alloy, Mo containing meta such as Mo and Mo alloy, Cr, Ti or Ta. The gate lines 121 and the storage electrode lines 131 may have a multi-layered structure including two films having different physical characteristics, a lower film (not shown) and an upper film (not shown). The upper film is preferably made of low resistivity metal including Al containing metal such as Al and Al alloy for reducing signal delay, or voltage drop in the gate lines 121 and the storage electrode lines 131. On the other hand, the lower film is preferably made of material such as Cr. Mo and Mo alloy, which has good contact characteristics with other materials such as indium tin oxide (ITO) or indium zinc oxide (IZO). However, the gate lines 121 and the storage electrode lines 131 may be made of other various metals or conductive materials.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 and a plurality of semiconductor islands 154b preferably made of hydrogenated amorphous silicon (abbreviated to "a-Si") of polysilicon are formed on the gate insulating layer 140. Each semiconductor stripe 151 extends substantially in the longitudinal direction and has a plurality of projections 154a branched out toward the first gate electrodes 123a. The semiconductor islands 154b are disposed on the second gate electrodes 123b.

A plurality of ohmic contact stripes and islands 161 and 165a as well as a plurality of ohmic contact islands (not shown), which are preferably made of silicide or n+ hydrogenated a-Si heavily doped with n type impurity such as phosphorous, are formed on the semiconductor stripes 161 as well as on the semiconductor islands 154b. Each ohmic contact stripe 161 has a plurality of projections 163, and the projections 163 and the ohmic contact islands 165 are located in pairs on the projections 154a of the semiconductor stripes 151. The ohmic contact islands on the semiconductor islands 154b are also located in pairs.

The lateral sides of the semiconductor stripes 151 and the ohmic contacts 161 and 165 are inclined relative to a surface of the substrate, and the inclination angles thereof are preferable in a range between about 30-80 degrees.

A plurality of data lines 171 including a plurality of first source electrodes 173a and a plurality of first drain electrodes 175a as well as a plurality of second source electrodes 173b and a plurality of second drain electrodes 175b are formed on the ohmic contacts 161 and 165 and the gate insulating layer 140 as well as on the semiconductor islands 154b.

The date lines 171 for transmitting data voltages extend substantially in the longitudinal direction and intersect the gate lines 121, the storage electrode lines 131, and the branch connections 133d. Each data line 171 is disposed between adjacent branches 133a-133c and it includes an end portion 179 having a large area for contact with another layer or an external device. A plurality of branches of each data line 171, which project toward the first drain electrodes 175a, form the first source electrodes 173a. The second source electrodes 173b and the second drain electrodes 175b are disposed on the second gate electrodes 123b. Each of the first/second drain electrodes 175a/175b extends upward/downward from an end portion and includes an expansion having a large area for contact with another layer and each of the first/second source electrodes 173a/173b is curved to partly enclose an end portion of the first/second drain electrode 175a/175b.

A first gate electrode 123a, a first source electrode 173a, and a first drain electrode 175a along with a projection 154a of a semiconductor stripe 151 form a first TFT having a channel formed in the projection 154a disposed between the first source electrode 173a and the first drain electrode 175a. Similarly, a second gate electrode 123b, a second source electrode 173b, and a second drain electrode 175b along with a semiconductor island 154 form a second TFT having a channel formed in the semiconductor island 154b disposed between the second source electrode 173b and the second drain electrode 175b.

In the meantime, each of the first drain electrodes 175a extends to form a coupling electrode 176b and the coupling electrode 176b includes a longitudinal portion partly overlapping a first storage electrode 133a, three oblique portions connected to the longitudinal portion and extending parallel to each other, and a transverse portion connected to one of the three oblique portions and partly overlapping the third storage electrode 133c. The oblique portions of the coupling electrode 176b make an angle of about 45 degrees with the gate lines 121. Two of the oblique portions are connected to respective ends of the longitudinal portion and approximately making a right angle and remaining one of the oblique portions are connected to an intermediate point of the longitudinal portion and to the expansion of the first drain electrode 175b.

The data lines 171, the drain electrodes 175a and 175b, and the second source electrodes 173b are preferably made of refractory metal such as Cr, Mo containing metal, Ti and Ti, or Al containing metal and they may also have a multilayered structure including a lower film (not shown) preferably made of refractory metal and an upper film (not shown) located thereon and preferably made of low resistivity material.

Like the gate lines 121 and the storage electrode lines 131, the data lines 171, the drain electrodes 175a and 175b, and the second source electrodes 173b have tapered lateral sides, and the inclination angles thereof range about 30-80 degrees.

The ohmic contacts 161 and 165 are interposed only between the underlying semiconductor stripes 151 and the overlying data lines 171, the overlying drain electrodes 175a and 175b, and the second source electrodes 173b thereon and reduce the contact resistance therebetween. The semiconductor stripes and islands 151 and 154b include a plurality of exposed portions, which are not covered with the data lines 171, the drain electrodes 175a and 175b, and the second source electrodes 173b, such as portions located between the source electrodes 173a and 173b and the drain electrodes 175a and 175b.

A passivation layer 180 is formed on the data lines 171, the drain electrodes 175a and 175b, the second source electrodes, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride. The passivation layer 180 may include a lower film of inorganic insulator and an upper film of organic insulator.

The passivation layer 180 has a plurality of contact holes 181a, 181b, 183 and 186 exposing the expansions of the first and second drain electrodes 175a and 175b, the end portions 179 of the data lines 171, and the second source electrodes 173b, respectively. The passivation layer 180 and the gate insulating layer 140 have a plurality of contact holes 182, 183 and 184 exposing the end portions 125 of the gate lines 121, end portions of the first storage electrodes 133a, and portions of the storage electrode lines near the end portions of the first storage electrodes 133a, respectively.

A plurality of pairs of first and second pixel electrodes 190a and 190b, a plurality of contact assistants 95 and 97, and a plurality of storage connections 91, which are preferably made of a transparent conductor such as ITO and IZO or a reflective conductor such as Al are formed on the passivation layer 180.

The storage connections 91 cross over the gate lines 121 and the second source electrodes 173b and they are connected to the exposed projection of the end portions of the first storage electrodes 133a and the exposed portions of the storage electrode lines 131 respectively through the contact holes 184 and 185 opposite each other with respect to the gate lines 121. In addition, the storage connections 91 are connected to the second source electrodes 173b through the contact holes 186. The storage electrode lines 131 including the storage electrodes 133a and 133b along with the storage connections 91 and the second source 173b may be used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the storage connections 91 by a laser beam to electrically connect the gate lines 121 to the storage connections 91. In this case, the second source electrodes 173b enhance the electrical connection between the gate lines 121 and the storage connections 91.

The first/second pixel electrodes 190a/190b are physically and electrically connected to the first/second (train electrodes 175a/1751b through the contact holes 181a/181b such that the first/second pixel electrodes 190a/190b receive the data/common voltages from the first/second drain electrodes 175a/175b. In addition, the second pixel electrodes 190b overlap the coupling electrodes 176b.

The pixel electrodes l90a and 190b supplied with the data voltages generate electric fields in cooperation with the common electrode 270, which reorient liquid crystal molecules 310 in the liquid crystal layer 300.

A pixel electrode 190a/190b and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190a and 190b with the storage electrode lines 131 including the storage electrodes 133a, 133b and 133c.

A pair Of first and second pixel electrodes 190a and 190b engage with each other interposing a gap 191 and their outer boundary has substantially a shape of rectangle with chamfered left corners. The first pixel electrode 190a has a shape of a rotated equilateral trapezoid having a left edge disposed near a longitudinal portion of a coupling electrode 176b, a right edge disposed near a second storage electrode 133b, and a pair of upper and lower oblique edges extending substantially parallel to the oblique portions of the coupling electrode 176b and thereby making an angle of about 45 degrees with the gate lines 121. The second pixel electrode 190b includes a pair of trapezoidal portions facing the oblique edges of the first pixel electrode 190a and a longitudinal portion facing the left edge of the first pixel electrode l90a. Accordingly the gap 191 has a pair of oblique upper and lower portions having a substantially uniform width and making an angle of about 45 degrees with the gate lines 121 and a longitudinal portion having a substantially uniform width.

The first pixel electrode 190a has upper and lower cutouts 192 and a pair of middle cutouts 193 and 194, which partition the first pixel electrode 190a into a plurality of partitions. The upper and the lower cutouts 192 are disposed at upper and lower halves of the pixel electrode 190, respectively and the middle cutouts 193 and 194 are located between the upper cutout 92 and the lower cutout 92. The gap 191 and the cutouts 192 and 194 substantially have inversion symmetry with respect to an imaginary transverse center line bisecting the upper and the lower halves of the first pixel electrode 190a.

The upper cutout 192 extends substantially parallel to the upper oblique portion of the gap 191 and substantially perpendicular to the lower cutout 192, which extends substantially parallel to the upper oblique portion of the gap 191. The upper and the lower cutouts 192 extend approximately from the left edge of the first pixel electrode190a approximately to the right edge of the first pixel electrode 190a.

The middle cutout 193 includes a transverse portion extending approximately from the left edge of the first pixel electrode 190a along the transverse center line of the pixel electrode 190 and a pair of oblique portions extending from the transverse portion to the right edge of the first pixel electrode 190a and extending substantially parallel to the upper cutout 192 and the lower cutout 192, respectively. The middle cutout 194 extends along the transverse center line of the first pixel electrode 190a and has an inlet from the right edge of the pixel electrode 190a, which has a pair of oblique edges substantially parallel to the upper cutout 192 and the lower cutout 192, respectively.

Accordingly, the upper half of the first pixel electrode 190a is also partitioned into three upper partitions by the upper cutout 192 and the middle cutout 193, and the lower half of the first pixel electrode 190a is partitioned into three lower partitions by the lower cutout 192 and the middle cutout 193. The number of partitions or the number of the cutouts is varied depending on the design factors such as the size of pixels, the ratio of the transverse edges and the longitudinal edges of the first and second pixel electrodes l90a and 190b, the type and characteristics oft he liquid crystal layer 300 and so on. For descriptive convenience, the gap 191 is also referred to as a cutout.

In the meantime, the storage electrode lines 131 may further include a plurality of branches (not shown) overlapping the cutouts 191-194.

The contact assistants 95 and 97 are connected to the end portions 125 of the gate lines 121 and the end portions 179 of the data lines 171 through the contact holes 182 and 1483, respectively. The contact assistants 95 and 97 protect the end portions 125 and 179 and complement the adhesiveness of the end portions 125 and 179 and external devices.

The description of the common electrode panel 200 follows with reference to FIGS. 2-4.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably of transparent conductive material such as ITO and IZO is formed on the overcoat 250.

The common electrode 270 has a plurality of sets of cutouts 271-276.

A set of cutouts 274-276 face a pair of first and second pixel electrodes 190a and 190b and include a plurality of lower and upper cutouts 271 and 272 and 275 and 276 and middle cutouts 273 and 274. Each of the cutouts 271-276 is disposed between adjacent cutouts 191-194 of the first pixel electrode 190a, or between the cutout 191 and a chamfered edge of the second pixel electrode 190b. In addition, each of the cutouts 271-276 has at least an oblique portion extending parallel to the upper cutout 192 or the lower cutout 192 of the first pixel electrode 190a, and the distances between adjacent two of the cutouts 271-276 and 191-194, the oblique portions thereof, and the chamfered edges of the second pixel electrode 190b, which are parallel to each other, are substantially the same. The cutouts 271-276 substantially have inversion symmetry with respect to an imaginary transverse center line of the first pixel electrode 190a. The oblique portions of the cutouts 271, 272 and 276 overlap the oblique portions of the coupling electrodes 176b that prevents light leakage near the cutouts 271, 272 and 276.

Each of the cutouts 271 and 276 has an oblique portion extending approximately from a left edge of the pixel electrode 190 approximately to an upper or lower edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 272 and 275 has an oblique portion, a longitudinal portion connected to an end of the oblique portion, and an expansion connected to the other end of the oblique portion. The oblique portion extends approximately from the left edge of the pixel electrode 190 approximately to upper right or lower right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 273 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions the cutout 274 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 271-276 may be varied depending on the design factors, and the light blocking member 220 may also overlap the cutouts 271-276 to block the light leakage through the cutouts 271-276.

In the meantime, the cutouts 271-276 may expose portions of the color filters 230 if there is no overcoat 250, and the exposed portions of the color filters 230 may contaminate the LC layer 300.

Alignment layers 11 and 21 for aligning the LC molecules 310 are coated on inner surfaces of the panels 10O and 200, and crossed polarizers 12 and 22 are provided on outer surfaces of the panels 100 and 200, respectively, such that a transmissive axis of one of the polarizers 12 and 22 is parallel to the transverse direction. One of the polarizers may be omitted when the LCD is a reflective LCD.

The LC laver 300 has negative dielectric anisotropy and the LC molecules 310 in the LC layer 300 are aligned such that their long axes are substantially vertical to the surfaces of the panels in absence of electric field.

Figure 5:
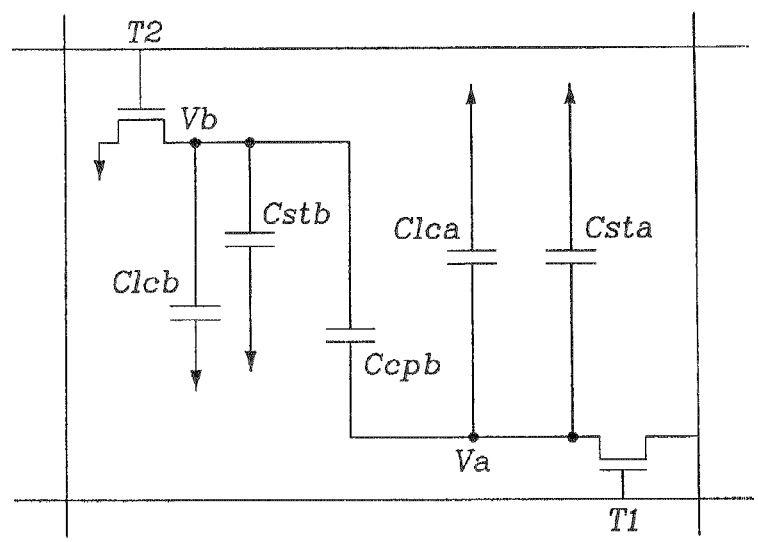
FIG. 5 is an equivalent circuit of the LCD shown in FIGS. 1-4.

The LCD shown in FIGS. 1-4 is represented as an equivalent circuit shown in FIG. 5.

Referring to FIG. 5, the LCD includes a plurality of gate lines, a plurality of data lines, and a plurality of pixels and each pixel includes a pair of first and second subpixels and a coupling capacitor Ccpb. Each subpixel includes a first/second LC capacitor Clca/Clcb, a first/second storage capacitor Csta/Cstb, and a first/second TFT T1/T2. The first/second LC capacitor Clca/Clcb is formed of a first/second pixel electrode 190a/190b, a common electrode 270, and a region of a LC layer 300 disposed on the first/second pixel electrode 190a/190b. The first/second storage capacitor Csta/Cstb is formed of the first/second pixel electrode 190a/l90b, a storage electrode line 131 and insulator(s) 140 and 180 interposed therebetween. The first TFT T1 is connected to a gate line, a data line supplied with data voltages, and the capacitor Clca and Csta while the second TFT T2 is connected to a gate line previous to the gate line connected to the TFT TI, a storage electrode line supplied with a common voltage, and the capacitors Clcb and Cstb. The coupling capacitor Ccpb is formed of a coupling electrode 176b, the second pixel electrode 190b, and an insulator 140 interposed therebetween, and connected between output terminals of the TFTs T1 and T2.

Now, a behavior of a pixel is described in detail.

When the previous gate line connected to the second TFT T2 is supplied with a gate-on voltage, the second TFT T2 turns on to transmit the common voltage to the second pixel electrode 190b, which in turn is refreshed by the common voltage. When the previous gate line is supplied with a gate-off voltage, the second pixel electrode 190b becomes floating. When the current gate line connected to the first TFT T1 is supplied with a gate-on voltage, the first TFT T1 turns on to transmit a data voltage to the first pixel electrode 190a. Since the second pixel electrode 190b is floating and capacitively coupled to the first pixel electrode 190a through the coupling capacitor Ccpb, the voltage of the second pixel electrode 190b is changed the capacitive coupling. The capacitive coupling makes the magnitude of the voltage of the second pixel electrode 190b higher than that of the first pixel electrode 190a, which will be described in detail.

The voltage across the first LC capacitor Clca is denoted by Va(=Vd1), and the voltage across the second LC capacitor Clcb is denoted by Vb. The voltage distribution law results in:

$$Vb \approx 1/(C_1+2C_2) \times [(2-C_3/C_2) \times (C_1+C_2) \times Vd1],$$

where $C_1$=Clca+Csta, $C_2$=Ccpb and $C_3$=Clcb+Cstb, and capacitances of the capacitors Clca, Csta, Clcb, Cstb and Ccpb are denoted by the same characters as those of the capacitors Clca, Csta, Clcb, Cstb, and Ccpb. Parasitic capacitances between terminals of the TFTs T1 and T2 are neglected since it is trivial.

The voltage Vb can be controlled such that the voltage Vb approaches the voltage Va but always higher than the voltage Va by adjusting the capacitances capacitors Clca, Csta, Clcb, Cstb, and Ccpb. In particular, the ratio of the voltages Va and Vb can be effectively controlled by adjusting the capacitance Ccpb. The capacitance Ccpb can be adjusted by varying the overlapping area or the distance between the coupling electrode 176b and the second pixel electrode 190b. For example, the overlapping area can be varied by changing the width of the coupling electrode 176b and the distance can be varied by placing the coupling electrode 176b in the same layer as the gate lines 121.

The non-zero voltages across the LC capacitors Clca and Clcb generate electrical fields substantially perpendicular to the surfaces of the panels 100 and 200 and the LC molecules 310 tend to change their orientation in response to the electric field such that their long axes are perpendicular to the field directions. Since the field strength in the first LC capacitor Clca is different from that in the second LC capacitor Clcb, the LC molecules 310 in the first and the second LC capacitors Clca and Clcb experience different tilting forces to have different tilt angles. Accordingly, the lateral visibility is improved.

According to experiments, the lateral visibility of LCDs according to this embodiment represented by 1-(gradient of lateral gamma curve)/(gradient of front gamma curve) was measured to be about 0.22-0.35 that is excellent. In addition, the aperture ratio of the LCDs was almost equal to that of LCDs having a pixel electrode per a pixel.

The area of the first pixel electrode 190a is preferably larger than that of the second pixel electrode 190b, but it is preferably smaller than about six times the area of the second pixel electrode 190b. In the LCD shown in FIGS. 1-4, the area of the first pixel electrode 190a is about five times the area of the second pixel electrode 190b. In addition, the ratio of the voltages Va and Vb is preferably in a range between about 0.50 and about 0.95.

In the meantime, a set of the cutouts 191-194 and 271-276 divides a pair of first and second pixel electrodes 190a and 190b into a plurality of subareas and each subarea has two major edges as shown in FIG. 3. The cutouts 191-194 and 271-276 control the tilt directions of the LC molecules 310 in the LC laver 300. This will be described in detail.

The cutouts 191-194 and 271-276 of the first electrodes 190a and 270 and the edges of the second pixel electrodes 190 distort the electric fields to have a horizontal component. The horizontal components of the electric fields are perpendicular at the edges of the cutouts 191-194 and 271-276 and the edges of the pixel electrodes 190.

Accordingly, the tilt directions of the LC molecules 310 on the subareas are different and thus the viewing angle is enlarged.

At least one of the cutouts 191-194 and 271-276 can lie substituted with protrusions or depressions, and the shapes and the arrangements of the cutouts 191-194 and 271-276 may be modified.

Furthermore, and the shape and position of the coupling electrode 176b may be modified, which will be described in detail.

An LCD according to another embodiment of the present invention will be described in detail with reference to FIGS. 6 and 7.

Figure 6:
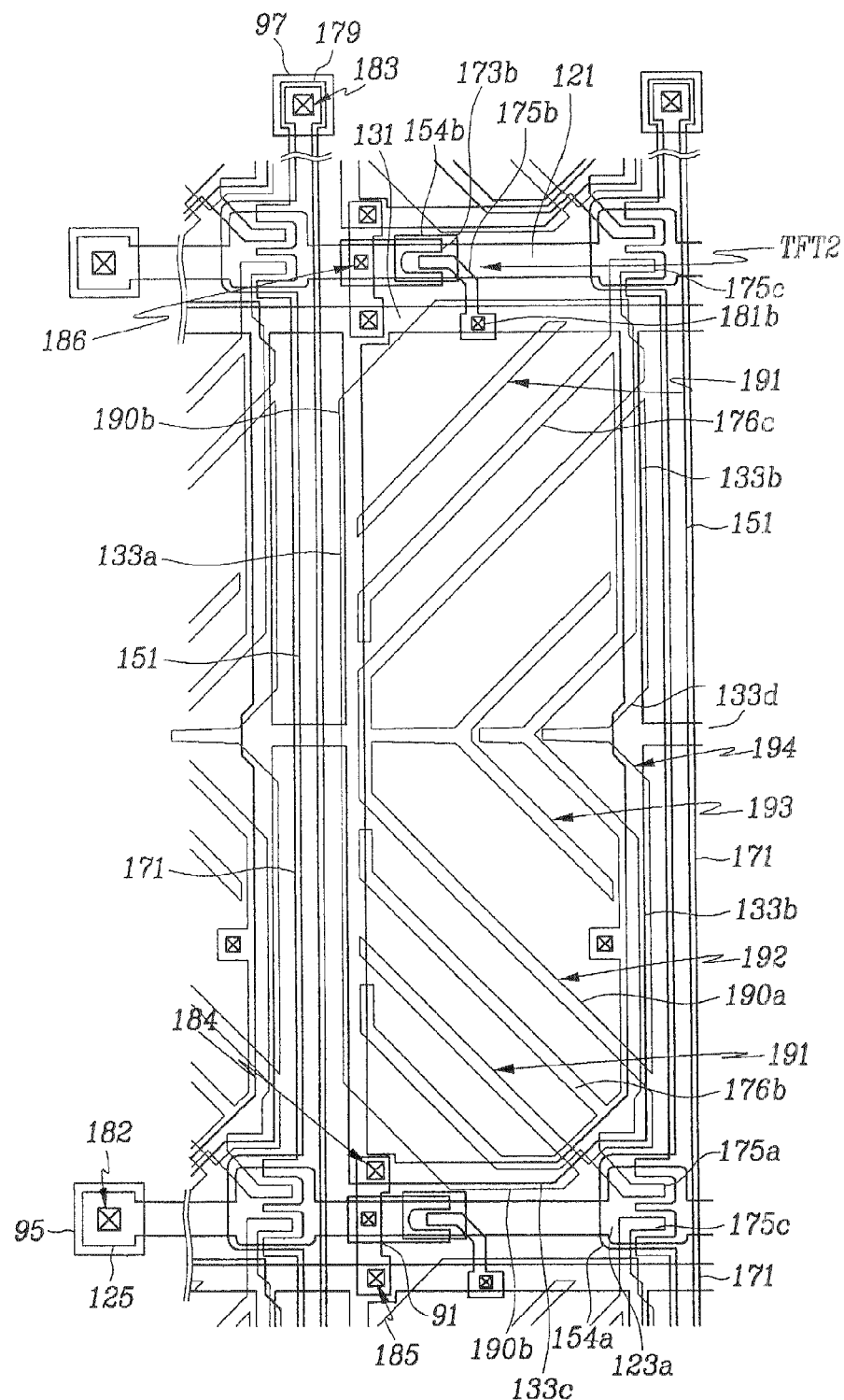
FIG. 6 is a layout view of a TFT array panel for an LCD according to another embodiment of the present invention.
Figure 7:
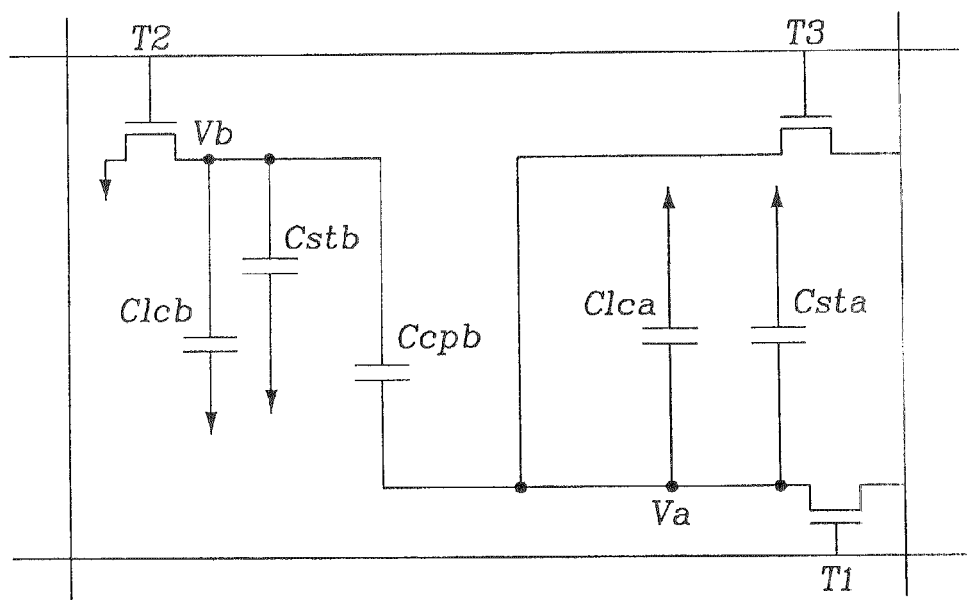
FIG. 7 is an equivalent circuit diagram of an LCD including the TFT array panel shown in FIG. 6.

FIG. 6 is a layout view of a TFT array panel for an LCD according to another embodiment of the present invention and FIG. 7 is an equivalent circuit diagram of an LCD including the TFT array panel shown in FIG. 6.

An LCD according to this embodiment includes a TFT array panel shown in FIG. 6, the common electrode panel 200 shown in FIG. 2, and the LC layer 310 shown in FIG. 4, and layered structures of the panels according to this embodiment are almost the same as that shown in FIG. 4.

Regarding the TFT array panel, a plurality of gate lines 121 including a plurality of first and second gate electrodes 123a and 123b and end portions 125 and a plurality of storage electrode lines 131 including a plurality of first to third storage electrodes 133a-133c and branch connections 133d are formed on a substrate 110 and a gate insulating layer 140, a plurality of semiconductor stripes 151 including a plurality of projections 154a and a plurality of semiconductor islands 154b, and a plurality of ohmic contact stripes 161 including a plurality of projections 163 anti a plurality of ohmic contact islands 165 are sequentially formed thereon. A plurality of data lines 171 including a plurality of first source electrodes 173a and end portions 179, and a plurality of first and second drain electrodes 175a and 175b are formed on the ohmic contacts 161 and 165, and a passivation layer 180 is formed thereon. A plurality of contact holes 181a-186 are provided at the passivation layer 180 and the gate insulating layer 140. A plurality of sets of first and second pixel electrodes 190a and 190b having a plurality of cutouts 191-194, a plurality of contact assistants 95 and 97, and a plurality of storage connections 91 are formed on the passivation layer 180.

Regarding the common electrode panel 200, a tight blocking member 220, a plurality of color filters 230, an overcoat 250, and a common electrode 270 having a plurality of cutouts 271-276 are formed on an insulating substrate 210 as shown in FIGS. 2 and 4.

Different from the LCD shown in FIGS. 1-5, a pair of first and second pixel electrodes 190a and 190b according to this embodiment are divided along a cutout 192 rather than a cutout 191 and a pixel of the LCD according to this embodiment includes first to third TFTs T1-T3. Like the LCD shown in FIGS. 1-5, the first TFT: T1 is connected to a gate line, a data line supplied with data voltages, and a first LC capacitor Clca and a first storage capacitor Csta, while the second TFT T2 is connected to a gate line previous to the gate line connected to the TFT T1, a storage electrode line supplied with a common voltage, and a second LC capacitor Clcb and a second storage capacitor Cstb. The third TFT T3 is connected to the previous gate line, the data line, and the capacitors Clcb and Cstb.

Referring to FIG. 5, first TFT T1 includes a first gate electrode 123a, a first source electrode 173a, and a first drain electrode 175a, while the third TFT T3 includes a first gate electrode 123a connected to the previous gate line, a first source electrode 173a, and a third drain electrode 175c. The second TFT T2 includes a second gate electrode 123b, a second source electrode 173b, and a second drain electrode 175b.

The first and the third drain electrodes 175a and 175 extend along a second storage electrode 133b and then they are curved along a cutout 274 to meet each other. The first drain electrode 175a has a pair of branches that form a coupling electrode 176b and overlap the cutouts 271 and 272. The third drain electrode 175d has a branch that forms a coupling electrode 176c and overlaps the cutout 275.

In operation, when the previous gate line connected to the second and the third TFTs T2 and T3 is supplied with a gate-on voltage, the second TFT T2 turns on to transmit the common voltage to the second pixel electrode 190b and the third TFT T3 also turns on to transmit a data voltage for a previous pixel to the first pixel electrode 190a. Then, the coupling capacitor Ccpb stores the voltage difference between the previous data voltage and the common voltage. When the current gate line connected to the first TFT T1 is supplied with a gate-on voltage, the first TFT T1 turns on to transmit a data voltage for a current pixel to the first pixel electrode 190a. Since the second pixel electrode 190b is floating and capacitively coupled to the first pixel electrode 190a through the coupling capacitor Ccpb, the voltage of the second pixel electrode 190b is changed by the capacitive coupling.

Many of the above-described features of the LCD shown in FIGS. 1-5 may be appropriate to the LCD shown in FIGS. 6 and 7.

An LCD according to another embodiment of the present invention will be described in detail with reference to FIGS. 8 and 9.

Figure 8:
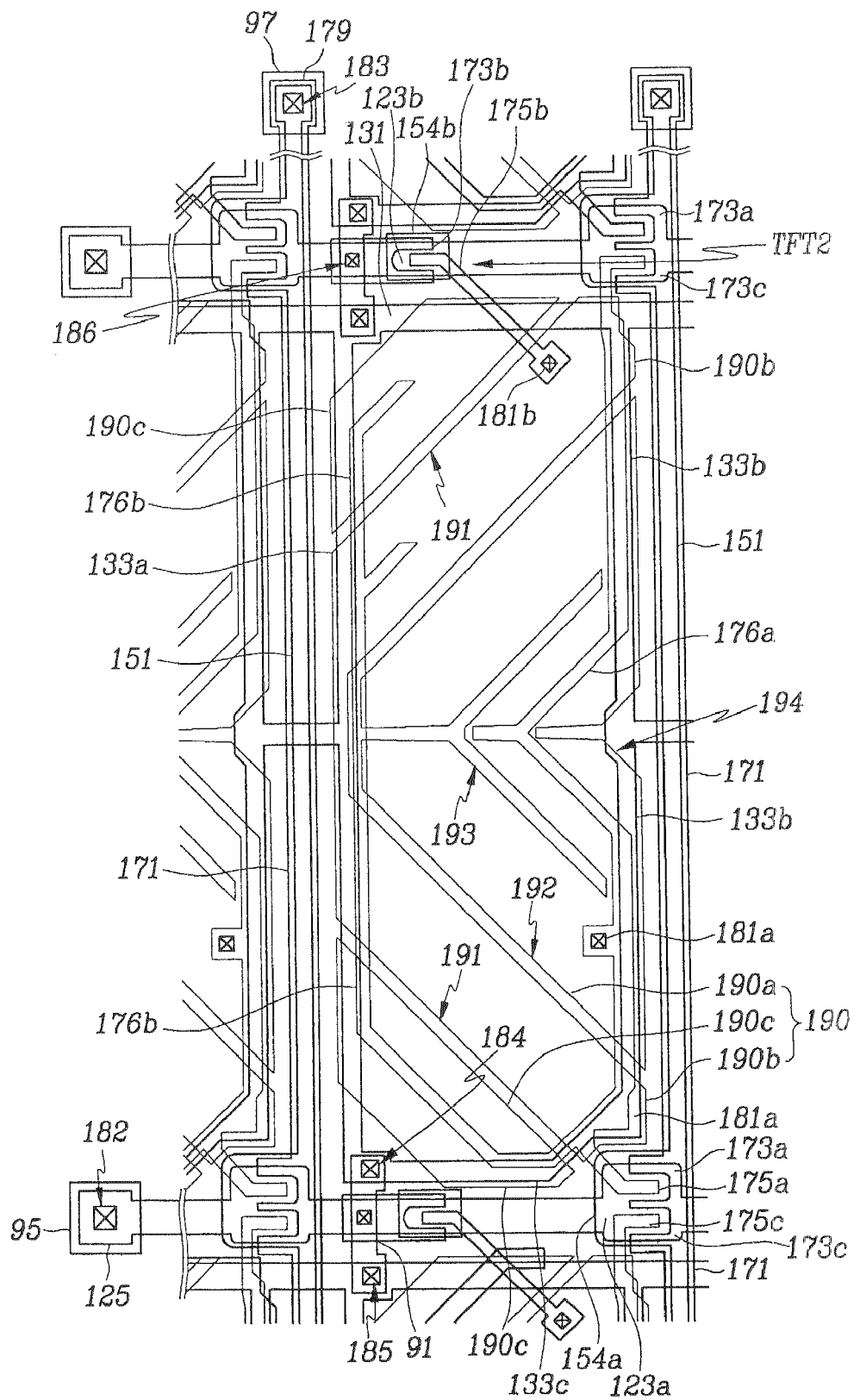
FIG. 8 is a layout view of a TFT array panel for an LCD according to another embodiment of the present invention.
Figure 9:
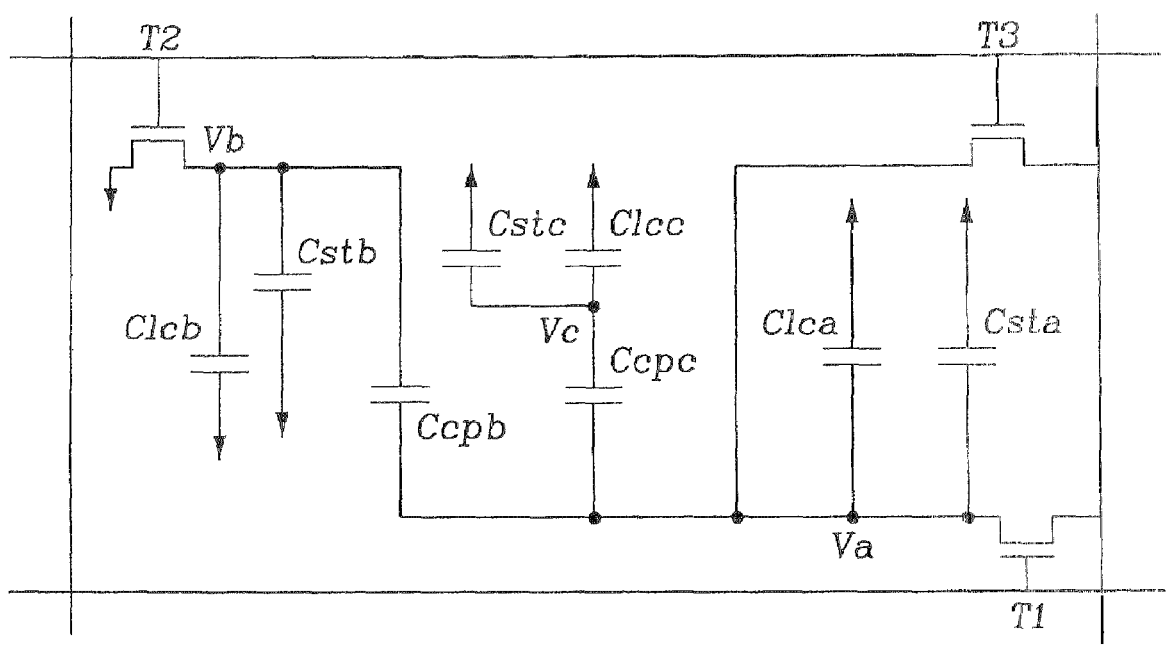
FIG. 9 is an equivalent circuit diagram of an LCD including the TFT array panel shown in FIG. 8.

FIG. 8 is a layout view of a TFT array panel for an LCD according to another embodiment of the present invention, and FIG. 9 is an equivalent circuit diagram of an LCS inc the TFT array panel shown in FIG. 8.

An LCD according to this embodiment includes a TFT array panel shown in FIG. 8, the common electrode panel 200 shown in FIG. 2, and the LC layer 310 shown in FIG. 4, and layered structures of the panels according to this embodiment are almost the same as that shown in FIG. 4.

Regarding the TFT array panel that is similar to that shown in FIG. 6, a plurality of gate lines 121 including a plurality of first and second gate electrodes 123a and 123b and end portions 125 and a plurality of storage electrode lines 131 including a plurality of first to third storage electrodes 133a-133c and branch connections 133d are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163 and a plurality of ohmic contact islands 165 are sequentially formed thereon. A plurality of data lines 171 including a plurality of first source electrodes 173a and end portions 179, and a plurality of first and second drain electrodes l75a and 175b are formed on the ohmic contacts 161 and 165, and a passivation layer 180 is formed thereon. A plurality of contact holes 181-186 are provided at the passivation layer 180 and the gate insulating layer 140. A plurality of sets of pixel electrodes 190a-190c having a plurality of cutouts 191-194, a plurality of contact assistants 95 and 97, and a plurality of storage connections 91 are formed on the passivation layer 180.

Regarding the common electrode panel 200, a light blocking member 220, a plurality of color filters 230, an overcoat 250, and a common electrode 270 having a plurality of cutouts 271-276 are formed on an insulating substrate 210 as shown in FIGS. 2 and 4.

Different from the LCD shown in FIGS. 6 and 7, a set of pixel electrodes 190a-190c include first, second and a pair of third pixel electrodes 190a-190c forming first to third LC capacitors Clca, Clcb, and Clcb and first to third storage capacitors Csta, Cstb and Cstc. The first and the second pixel electrodes 190a and 190b are divided along a cutout 192, while the second and the third pixel electrodes 190b and 190c are divided along a cutout 191. The third electrodes 190c are floating.

In addition, the first drain electrode 175a has a branch that forms a coupling electrode 176b and includes a transverse portion overlapping a third storage electrode 133, an oblique portion connected to the transverse portion and overlapping a cutout 271, a longitudinal portion overlapping a storage electrode 13a, and a pair of oblique portions partly overlapping cutouts 275 and 276. Accordingly, the coupling electrode 176b overlaps the second and the third pixel electrodes 190b and 190c to form coupling capacitors Ccpb and Ccpc. The third drain electrode 175d has no branch.

In operation, when the previous gate line connected to the second and the third TFTs T2 and T3 is supplied with a gate-on voltage, the second TFT T2 turns on to transmit the common voltage to the second pixel electrode 190b and the third TFT T3 also turns on to transmit a data voltage for a previous pixel to the first pixel electrode 190a. When the current gate tine connected to the first TFT T1 is supplied with a gate-on voltage, the first TFT T1 turns on to transmit a data voltage for a current pixel to the first pixel electrode 190a. Since the second and the third pixel electrodes 190b and 190c are floating and capacitively coupled to the first pixel electrode 190a through the coupling capacitor Ccpb, the voltages of the second and the third pixel electrodes 190b and 190c are changed by the capacitive coupling. The capacitive coupling makes the magnitude of the voltage of the second pixel electrode 190b higher than that of the first pixel electrode 190a, and it makes the magnitude of the voltage of the third pixel electrode 190c lower than that of the first pixel electrode 190a, which will be described in detail.

The voltage across the first LC capacitor Clca is denoted by Va, and the voltage across the third LC capacitor Clcc is denoted by Vc. The voltage distribution law results in:

$$Vb \approx Va \times [(Ccpc/(Ccpc+Clcc)] < Va$$

where capacitances of the capacitors Clcp and Clcc are denoted by the same characters as those of the capacitors Clcp anti Clcc. The ratio of the voltages Va and Vc can be effectively controlled by adjusting the capacitance Ccpc. The capacitance Ccpc can be adjusted by varying the overlapping area or the distance between the coupling electrode 176b and the third pixel electrode 190c. In the LCD shown in FIGS. 1-4, the area of the first to the third pixel electrode 190a has a proportion relation 1:137:0.44.

Many of the above-described features of the LCCD shown in FIGS. 1-7 may be appropriate to the LCD shown in FIGS. 8 and 9.

An LCD according to another embodiment of the present invention will be described in detail with reference to FIGS. 10 and 11.

Figure 10:
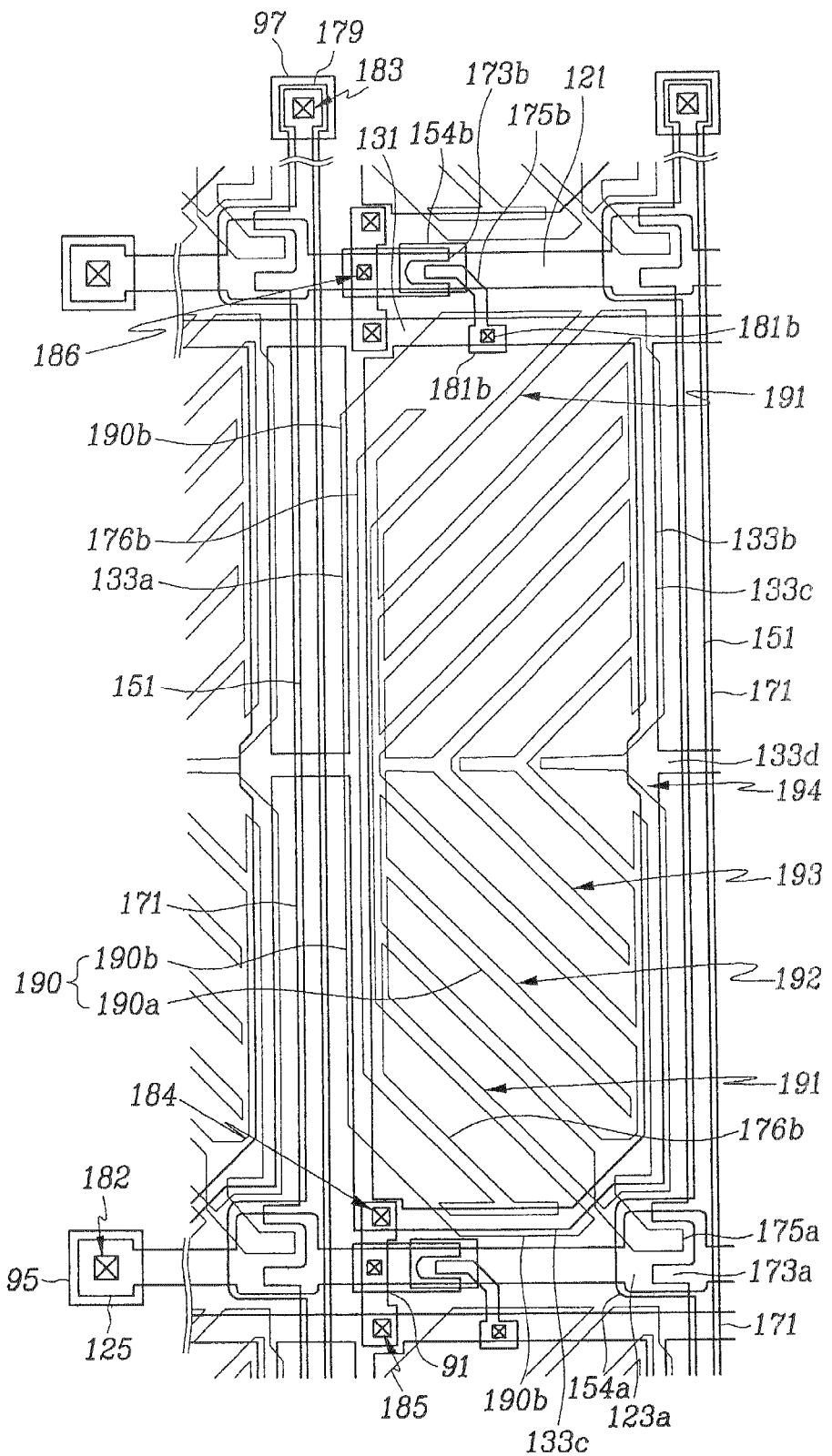
FIG. 10 is a layout view of a TFT array panel for an LCD according to another embodiment of the present invention.
Figure 11:
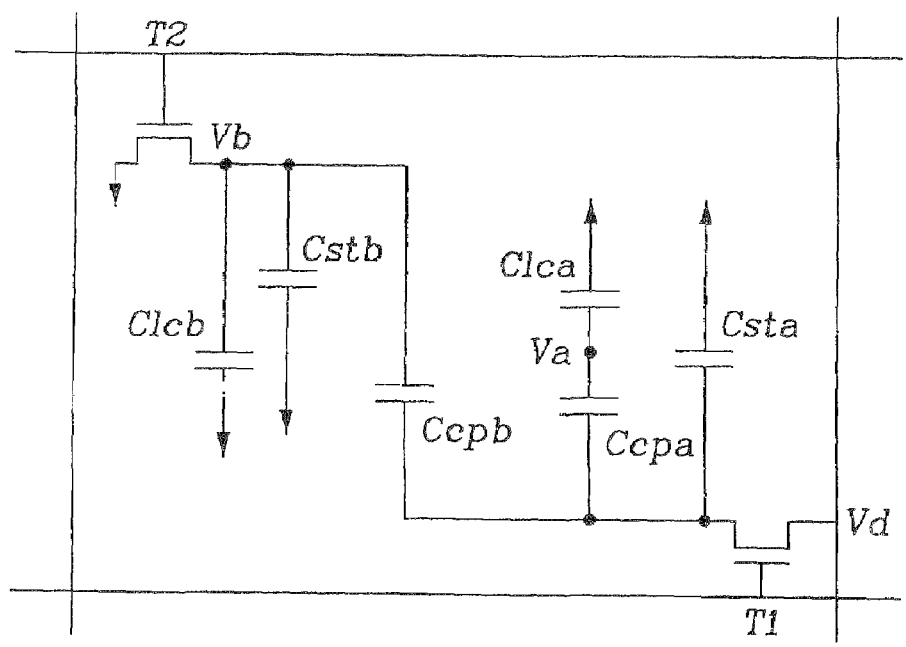
FIG. 11 is an equivalent circuit diagram of an LCD including the TFT array panel shown in FIG. 10.

FIG. 10 is a layout view of a TFT array panel for an LCD according to another embodiment of the present invention, and FIG. 11 is an equivalent circuit diagram of an LCD including the TFT array panel shown in FIG. 10.

An LCD according to this embodiment includes a TFT array panel shown in FIG. 10, the common electrode panel 200 shown in FIG. 2, and the LC layer 310 shown in FIG. 4, and layered structures of the panels according to this embodiment are almost the same as that shown in FIG. 4.

Regarding the TFT array panel, a plurality of gate lines 121 including a plurality of first and second gate electrodes 123a and 123b and end portions 125 and a plurality of storage electrode lines 131 including a plurality of first to third storage electrodes 133a-133c and branch connections 133d are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163 and a plurality of ohmic contact islands 165 are sequentially formed thereon. A plurality of data lines 171 including a plurality of first source electrodes 173a and end portions 179, and a plurality of first and second drain electrodes 175a and 175b are formed on the ohmic contacts 161 and 165, and a passivation layer 180 is formed thereon. A plurality of contact holes 181a and 182-186 are provided at the passivation layer 180 and the gate insulating layer 140. A plurality of sets of first and second pixel electrodes 190a and 190b having a plurality of cutouts 191-194, a plurality of contact assistants 95 and 97, and a plurality of storage connections 91 are formed on the passivation layer 180.

Regarding the common electrode panel 200, a light blocking member 220, a plurality of color filters 230, an overcoat 250, and a common electrode 270 having a plurality of cutouts 271-276 are formed on an insulating substrate 210 as shown in FIGS. 2 and 4.

Different from the LCD shown in FIGS. 1-5, the second pixel electrodes 190b according to this embodiment are floating and there is no contact hole exposing the first drain electrode 175a. In addition, the coupling electrodes 176a overlap all the cutouts 271-276 and almost all the storage electrodes 133a-133c. Accordingly, the coupling electrode 176b overlaps the first and the second pixel electrodes 190a and 190b to form coupling capacitors Ccpa and Ccpb. The capacitive coupling makes the magnitude of the magnitude of the voltage of the second pixel electrode 190c lower than that of the first pixel electrode 190a.

Many of the above-described features of the LCD shown in FIGS. 1-5 may be appropriate to the LCD shown in FIGS. 10 and 11.

An LCD according to another embodiment of the present invention will be described in detail with reference to FIGS. 12 and 13.

Figure 12:
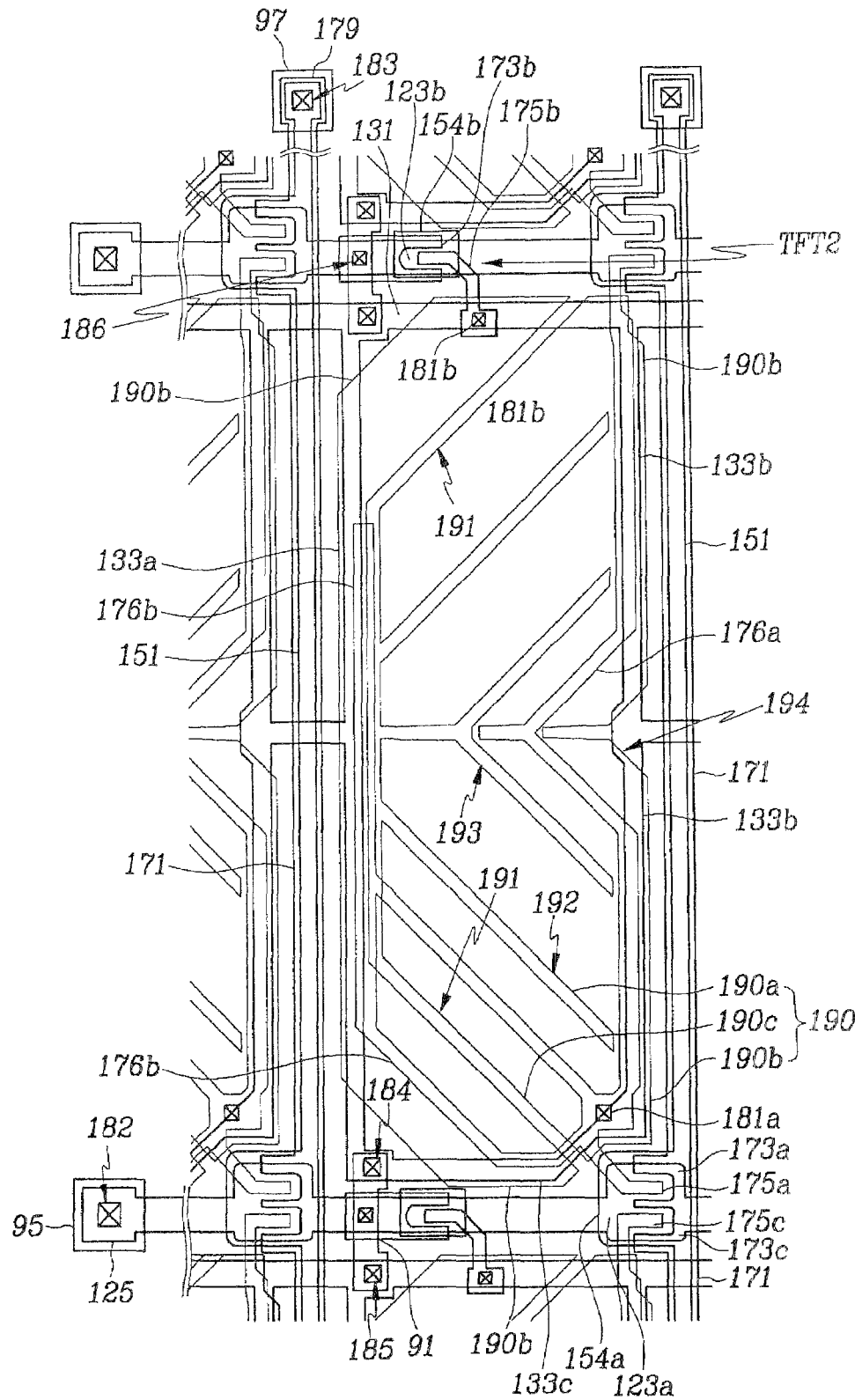
FIGS. 12 and 13 are layout views of TFT array panels for an LCD according to another embodiment of the present invention.

FIG. 12 and are layout views of TFT array panels for an LCD according to another embodiment of the present invention.

Figure 13:
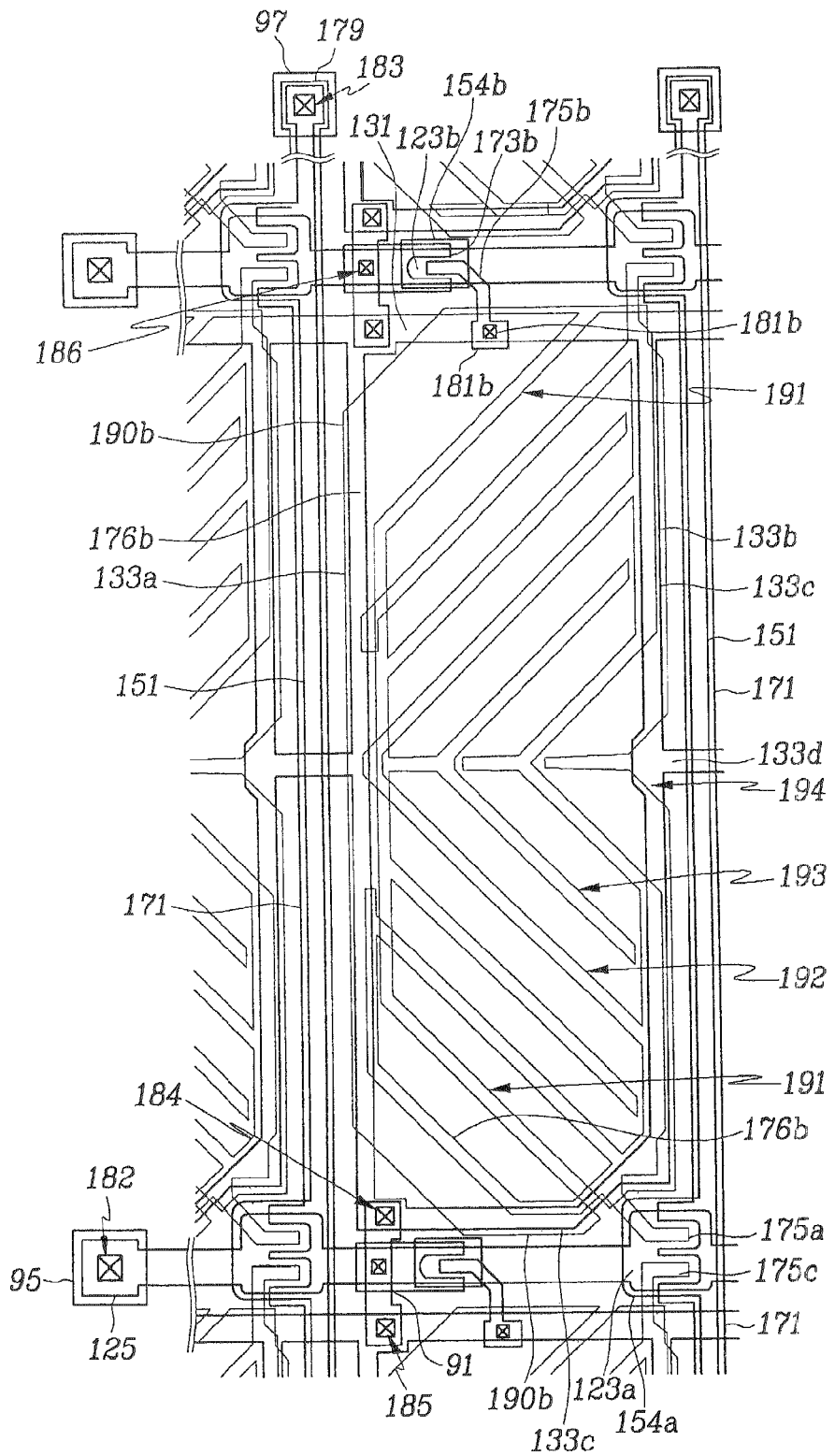

Each LCD according to these embodiments includes a TFT array panel shown in FIG. 12 or 13, the common electrode panel 200 shown in FIG. 2, and the LC layer 310 shown in FIG. 4, and layered structures of the panels according to this embodiment are almost the same as that shown in FIG. 4.

Regarding the TFT array panel, a plurality of gate lines 121 including a plurality of first and second gate electrodes 123a and 123b and end portions 125 and a plurality of storage electrode lines 131 including a plurality of first to third storage electrodes 133a-133c and branch connections 133d are formed on a substrate 110, and a gate insulating layer 140, a plurality of semiconductor stripes 151 including a plurality of projections 154a and a plurality of semiconductor islands 154b and a pliability of ohmic contact stripes 161 including a plurality of projections 163 and a plurality of ohmic contact islands 165 are sequentially formed thereon. A plurality of data lines 171 including a plurality of first source electrodes 173a and end portions 179 and a plurality of first and second drain electrodes 175a and 175b are formed on the ohmic contacts 161 and 165, and a passivation layer 180 is formed thereon. A plurality of contact holes 181a-186 are provided at the passivation layer 180 and the gate insulating layer 140. A plurality of sets of first and second pixel electrodes 190a and 190b having a plurality of cutouts 191-194, a plurality of contact assistants 95 and 97, and a plurality of storage connections 91 are formed on the passivation layer 180. The area ratio of the first and the second pixel electrodes 190a and 190b is about 5:1.

Regarding the common electrode panel 200, a light blocking member 220, a plurality of color filters 230, an overcoat 250, and a common electrode 270 having a plurality of cutouts 271-276 are formed on an insulating substrate 210 as shown in FIGS. 2 and 4.

LCD shown in FIG. 12 has a similar layout to the LCD shown in FIG. 6. However, a pair of first and second pixel electrodes 190a and 190b are divided. along a cutout 191 rather than a cutout 192. In addition, a coupling electrode 176n extending from the first drain electrode 175a has a transverse portion overlapping the third storage electrode, oblique portions overlapping the cutouts 271 and 272, and a longitudinal portion overlapping the first storage electrode 133a.

The LCD shown in FIG. 13 has a similar layout as the LCD shown in FIG. 10. However, a coupling electrode 176b extending from the drain electrode 175a and 175b has less overlapping portions than that shown in FIG. 10. For example, a longitudinal portion overlapping the first storage electrode 133a is shorter than that shown in FIG. 10.

Many of the above-described features of the LCD shown in FIGS. 1-5,6 and 10 may be appropriate to the LCD shown in FIGS. 12 and 13.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel for a liquid crystal display, comprising:
   a substrate;
   a plurality of first signal lines formed on the substrate;
   a plurality of second signal lines intersecting the first signal lines to define pixel areas;
   first and second pixel electrodes disposed substantially in a pixel area;
   a plurality of thin film transistors connected to the first and second signal lines and the first pixel electrodes; and
   a coupling electrode overlapping the first pixel electrode and the second pixel electrode;
   wherein the first pixel electrode has an area smaller than the second pixel electrode.

2. The thin film transistor array panel of claim 1, wherein the coupling electrode is connected to a drain electrode of the thin film transistors.

3. The thin film transistor array panel of claim 2, further comprising a tilt direction defining member for determining tilt directions of liquid crystal molecules formed on the substrate.

4. The thin film transistor array panel of claim 3, wherein the tilt direction determining member comprises a cutout of one of the first and the second pixel electrodes.

5. The thin film transistor array panel of claim 1, wherein the first and the second pixel electrodes have edges facing each other and forming a gap and the gap includes oblique portions making an angle of about 45 degrees with the gate lines.

6. The thin film transistor array panel of claim 1, further comprising a third signal line intersecting the second signal lines and supplied with a reference voltage,
   wherein the first and the second pixel electrodes are capacitively coupled to each other through the coupling electrode, and the thin film transistor is connected to one of the first signal lines, one of the second signal lines, arid the first pixel electrodes.

7. The thin film transistor array panel of claim 1, wherein the second pixel electrode has an area once to six times an area of the first pixel electrode.

8. The thin film transistor array panel of claim 7, further comprising a third pixel electrode capacitively coupled to the second pixel electrode.

9. A liquid crystal display comprising:
   a thin film transistor array panel including: a plurality of first signal lines;
   a plurality of second signal lines intersecting the first signal lines to define pixel areas;
   first and second pixel electrodes disposed substantially in a pixel area; a plurality of thin film transistors connected to the first and the second signal lines and the first pixel electrodes;
   a coupling electrode overlapping the first pixel electrode and the second pixel electrodes; and
   a common electrode panel including a common electrode for generating an electric field along with the first and the second pixel electrodes;
   wherein the first pixel electrode is supplied with higher voltage than the second pixel electrode.

10. The liquid crystal display of claim 9, wherein a first tilt direction defining member formed on the thin film transistor array panel; and
    a second tilt direction defining member determining tilt directions of liquid crystal molecules along with the first tilt direction defining member formed on the common electrode panel.

11. The liquid crystal display of claim 10, wherein the first and the second tilt direction defining members include cutouts formed in the pixel electrodes and the common electrode.

12. A liquid crystal display comprising:
    a first substrate;
    a plurality of first signal lines formed on the first substrate;
    a plurality of second signal lines intersecting the first signal lines to define pixel areas;
    first and second pixel electrodes disposed substantially in a pixel area;
    a plurality of thin film transistors connected to the first and the second signal lines and the first pixel electrodes;
    a coupling electrode overlapping the first pixel electrode and the second pixel electrode;
    a second substrate facing the first substrate; and
    a common electrode formed on the second substrate;

wherein the first pixel electrode has an area smaller than the second pixel electrode and the first pixel electrode is supplied with higher voltage than the second pixel electrode.

13. The liquid crystal display of claim 12, further comprising a first tilt direction defining member formed on the thin film transistor array panel; and a second tilt direction defining member determining tilt directions of liquid crystal molecules along with the first tilt direction defining member formed on the common electrode panel.

14. The liquid crystal display of claim 13, wherein a ratio of a voltage difference between the first pixel electrode and the common electrode and a voltage difference between the second pixel electrode and the common electrode is in a range between about 0.5-0.95.

15. The liquid crystal display of claim 13, wherein the tilt direction determining member comprises a cutout of one of the first and the second pixel electrodes.

16. The liquid crystal display of claim 12, wherein the coupling electrodes is connected to a drain electrode of the thin film transistors.

17. The liquid crystal display of claim 12, wherein the first and the second pixel electrodes have edges facing each other and forming a gap and the gap includes oblique portions making an angle of about 45 degrees with the gate lines.

18. The liquid display of claim 12, further comprising a third signal line intersecting the second signal lines and supplied with a reference voltage, wherein the first and the second pixel electrodes are capacitively coupled to each other through the coupling electrode, and the thin film transistors is connected to one of the first signal lines, one of the second signal lines, and the first pixel electrodes.

19. The liquid crystal display of claim 18, further comprising a third pixel electrode capacitively coupled to the second pixel electrode.

* * * * *